(12) United States Patent
Reinhard

(10) Patent No.: US 7,691,246 B2
(45) Date of Patent: *Apr. 6, 2010

(54) ADVANCED ELECTRODEIONIZATION FOR FLUID RECYCLING

(75) Inventor: Fred P. Reinhard, Mission Viejo, CA (US)

(73) Assignee: Exergy Technologies Corporation, Irvine, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 11/135,687

(22) Filed: May 24, 2005

(65) Prior Publication Data

US 2005/0217995 A1    Oct. 6, 2005

Related U.S. Application Data

(63) Continuation of application No. 10/339,381, filed on Jan. 9, 2003, now Pat. No. 6,905,608.

(60) Provisional application No. 60/351,046, filed on Jan. 22, 2002.

(51) Int. Cl.
*B01D 61/48* (2006.01)

(52) U.S. Cl. .................. 204/524; 204/529; 204/530; 204/542; 204/632

(58) Field of Classification Search ................ 204/524, 204/529, 530, 542, 632
See application file for complete search history.

(56) References Cited

U.S. PATENT DOCUMENTS

| | | | |
|---|---|---|---|
| 2,794,777 A | 6/1957 | Pearson | |
| 2,815,320 A | 12/1957 | Kollsman | |
| 2,923,674 A | 2/1960 | Kressman | |
| 3,149,061 A | 9/1964 | Parsi | |
| 5,316,637 A | 5/1994 | Ganzi et al. | |
| 5,558,753 A | 9/1996 | Gallagher et al. | |
| 6,017,433 A * | 1/2000 | Mani ........................... | 204/524 |
| 6,149,788 A | 11/2000 | Tessier et al. | |
| 6,306,282 B1 | 10/2001 | Dugan et al. | |
| 6,309,532 B1 | 10/2001 | Tran et al. | |
| 6,379,518 B1 * | 4/2002 | Osawa et al. .................. | 204/524 |

(Continued)

FOREIGN PATENT DOCUMENTS

DE      40 16 000      11/1991

(Continued)

OTHER PUBLICATIONS

Semmens et al. "An evaluation of continuous electrodeionization as an in-line process for plating rinsewater recovery" 2001. Wiley, Hoboken, NJ ETATS-UNIS. Environmental progess vol. 20, No. 4, pp. 251-260.*

(Continued)

*Primary Examiner*—Arun S Phasge
(74) *Attorney, Agent, or Firm*—Blakely, Sokoloff, Taylor & Zafman LLP

(57) ABSTRACT

In one embodiment, a system comprises a filter and at least one electrodeionization (EDI) unit for chemical recovery. The filter is adapted to receive a fluid and to remove a selected chemical element or contaminant from the fluid. The EDI unit is coupled to the filter and adapted to recover a chemical element from the fluid and to separate the recovered chemical element from the fluid.

19 Claims, 8 Drawing Sheets

U.S. PATENT DOCUMENTS 6,387,243 B1  5/2002  Gasser
6,905,608 B2 *  6/2005  Reinhard .................... 210/748

FOREIGN PATENT DOCUMENTS

| EP | 0 853 972 | 7/1998 |
|---|---|---|
| GB | 815154 | 6/1959 |
| GB | 882601 | 11/1961 |
| GB | 1137679 | 12/1968 |
| JP | 10-135173 | 8/1998 |
| WO | WO 02/02214 | 1/2002 |

OTHER PUBLICATIONS

Ganzi, G.C., A.J. Giuffrida, and T.E. Stone, "The Effect of Ion-exchange Membrane Properties on the Ionpure Continuous Deionization Process", Proceedings of the 1990 International Congress on Membranes and Membrane Processes, Chicago, Aug. 1990, pp. 861-863.

Ratkje, S.K., H. Torleif, and M.G. Skrede, "Cation Membrane Transport: Evidence for the Local Validity of Nernst-Planck Equations", Ber. Bunsenges. Phys. Chem., 92, 825-832 (1988).

Simons, R., "Electric Field Effects on Proton Transfer Between Ionizable Groups and Water in Ion Exchange Membranes", Electrochim. Acta vol. 29, No. 2) 151-158 (1984).

Rosenberg, N.W. and C.E. Tirrell, "Limiting Currents in Membrane Cells", Ind. and Eng. Chem., vol. 49, No. 4, Apr. 1957, pp. 780-784.

Demkin, V.I., Y.A. Tubashov, V.I. Panteleev, and Y.V. Karlin, "Cleaning Low Mineral Water by Electrodialysis", Desalination, 64(1987), pp. 367-374.

Govindan, K.P., and P.K. Narayanan, "Demineralization by Electrodialysis Using Ampholytic Ion-conducting Spacers", Desalination, 38(1981) pp. 517-527, Elsevier Scientific Publishing Company, Amsterdam.

Kedem, O., and Y. Maoz, "Ion Conducting Spacer for Improved Electrodialysis", Desalination, 19(1976), pp. 465-470, Elsevjer Scientific Publishing Company, Amsterdam.

Komgold, E., "Electrodialysis in Water Desalination and the Influence of Ion Exchange Resin Introduction into the Apparatus", Int. Symp. Brackish Water Factor Dev., [Proc.] 1976, 209-16.

Shaposhnik, V.A., A.K. Reshetnikova, R.I. Zolotareva, I.V. Drobysheva, and N.I. Isaev, "Demineralization of Water by Electrodialysis with Ion-exchanger Packing Between the Membranes", Translated from Zhurnal Prikladnoi Khimii, vol. 46, #12, pp. 2659-2663, Dec. 1973, original article submitted Jul. 12, 1971.

Ganzi, G.C., Y. Egozy, A.J. Giuffrida, and A.D. Jha, "High Purity Water by Electrodeionization: Performance of the Ionpure (™) Continuous Deionization System", Ultrapure Water, vol. 4, #3, pp. 43-50 (1987).

Ganzi, G.C., "Electrodeionization for High Purity Water Production", AIChE Symposium Series, No. 261, vol. 84, Membrane Materials and Processes for Separation, K.K. Sirkar and D.R. Lloyd (Ed.), New York, (1988), pp. 73-83.

Matejka, Z., "Continuous Production of High-Purity Water by Electro-deionisation", J. Appl. Chem. Biotechnol., 1971, vol. 21, April, p. 117-120.

Helfferich, F., "Ion Exchange", McGraw Hill Book Company, New York, 1962, Chapter 6, pp. 250-322.

Ganzi, G.C., Wood, J.H., and Griffin, C.S., Water Purification and Recycling Using the CDI Process, AIChE 1991 Summer National Meeting, Pittsburgh, symposium: The Recycling Industy—Where Does It Fit?, Paper 46c, Aug. 19, 1991.

* cited by examiner

ADVANCED ELECTRODEIONIZATION FOR FLUID RECYCLING

This application is a continuation of application Ser. No. 10/339,381, filed Jan. 9, 2003, now U.S. Pat. No. 6,905,608, which claimed the benefit of priority on U.S. Patent Application No. 60/351,046, filed on Jan. 22, 2002.

FIELD

Embodiments of the invention relate to the field of electrodeionization (EDI) systems and improved operations associated therewith.

GENERAL BACKGROUND

Currently, electrodeionization (EDI) systems are implemented with a multiplicity of alternating anion and cation selective membranes, and mixed bed ion exchange resins such as EDI systems described U.S. Pat. No. 2,815,320. For this system, EDI cells were exclusively used for high purity water generation. The development of ion exchange membranes, described in U.S. Pat. No. Re. 24,865, rapidly led to the development of conventional, high-performance EDI systems as described in U.S. Pat. Nos. 4,632,745 and 4,465,573. These conventional EDI systems are merely adapted to purify reverse osmosis permeate in order to generate high purity water for the power, electronics and semiconductor industries.

However, there are a number of disadvantages associated with the current usage of conventional EDI systems. For instance, conventional EDI systems require low level concentrations of ionic load in the feed stream. Elevated concentrations can cause fouling of the EDI cells by depositing an unwanted layer on an outer surface of a resin or membrane of the conventional EDI system and may require very frequent chemical cleaning and regeneration. Second, conventional EDI systems are exclusively used in an indirect manner for purification of reverse osmosis permeate with low total dissolved solids (TDS) levels such as salts. EDI systems neither have been designed nor have been used directly to handle hazardous chemicals.

Therefore, it is contemplated that modification of the operations of the EDI system may enable new applications for using EDI other than for purification of reverse osmosis permeate.

BRIEF DESCRIPTION OF THE DRAWINGS

The features and advantages of the invention will become apparent from the following detailed description of embodiments of the invention in which.

DETAILED DESCRIPTION

Figure 1:
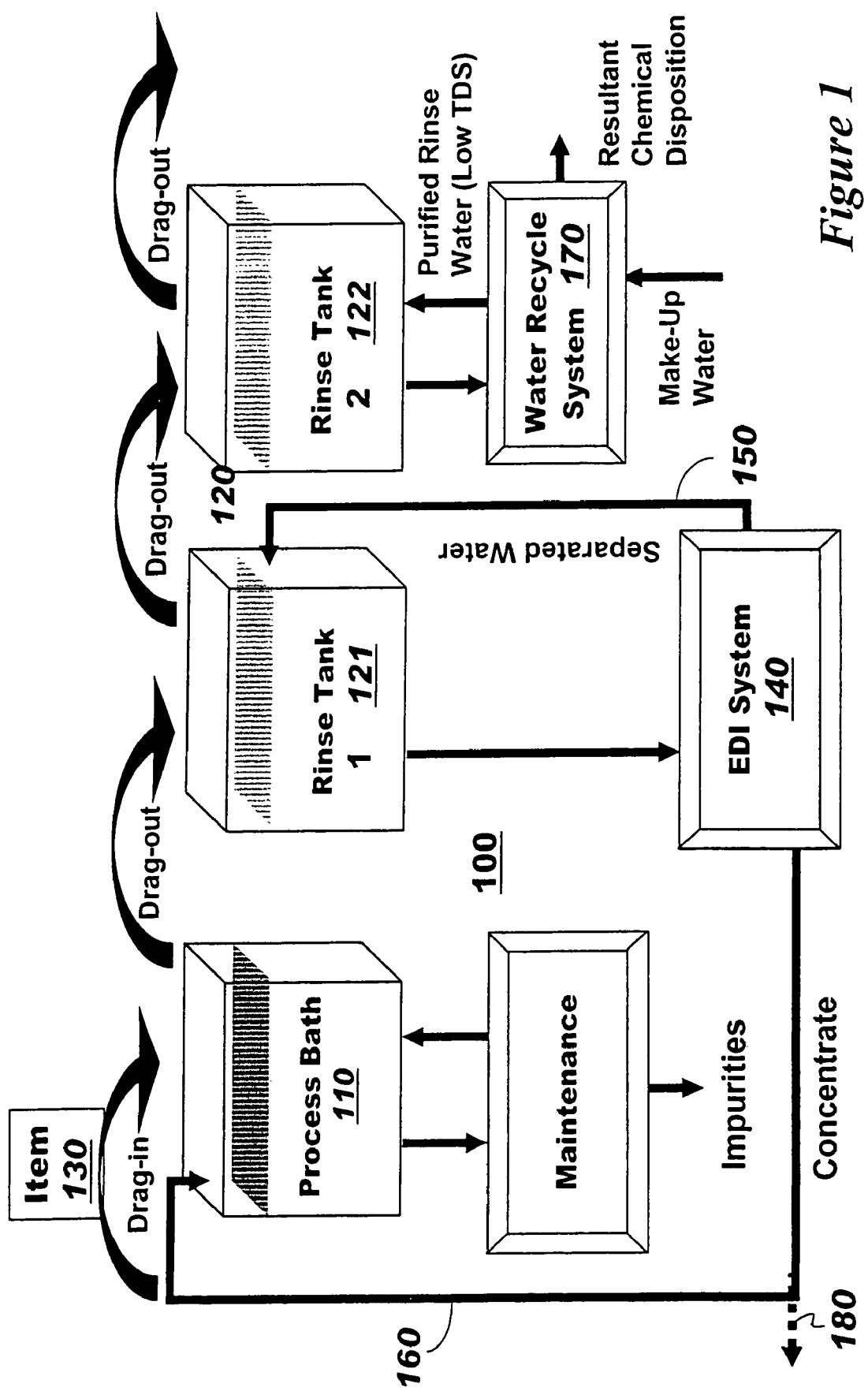
FIG. 1 is an exemplary embodiment of a system for recovery and maintenance in metal or electronic applications is shown.

Herein, embodiments of the invention relate to an electrodeionization (EDI) system and improved operations thereof. The embodiments described herein are not exclusive; rather, they merely provide a thorough understanding of the invention. Also, well-known elements are not set forth in detail in order to avoid unnecessarily obscuring the invention.

In the following description, certain terminology is used to describe features of the invention. For example, an "item" is any product requiring cleaning and/or surface applications such as metal or non-metal plating or coating operations. The types of products vary greatly such as electronic hardware (e.g., printed circuit boards, semiconductor wafer diskettes, packaged semiconductor components, etc.), automotive parts, aerospace parts, faucets, and miscellaneous manufactured fixtures. A "conduit" is a pathway for the transfer of fluid from one location to another. The conduit may be any sort plastic tubing, plastic or metal pipes and the like.

A "spacer" is generally defined as a device that provides a generally defined distance between two adjacent membrane sheets for liquid to flow or move therebetween. A "membrane sheet" is generally defined as a thin section of material that allows certain chemical elements to permeate from one side to another, while other chemical elements are precluded from passing through the membrane sheet. Examples of "chemical elements" include cations (positively charged ions) and anions (negatively charged ions). Of course, the chemical elements may be more specifically categorized as metals, non-metals, certain groupings of Periodic elements (e.g., Alkali metals, Alkaline Earth metals, etc.) or the like.

For instance, one embodiment of the inventive EDI system may involve an ability to perform chemical recovery applications independent from reverse osmosis. Another exemplary embodiment of the invention may improve the transfer of weakly ionized chemicals, the recovery and processing of hazardous materials, and the efficiency in removing weakly dissociated ions from fluid (e.g., process rinse water). Moreover, another embodiment of the invention may provide for lower maintenance, chemical element recycling applications and more cost effective rinse water recycling applications. Also, by utilizing EDI technology in the proposed configuration, enhanced recycling and regeneration of ion exchange resin bed(s) may be achieved.

New applications for using EDI systems to recycle rinse water and chemicals may include, but are not limited or restricted to the following: (1) Printed Circuit Board (PCB) cleaning line rinse water for inner layers; (2) PCB multibond line rinse water; (3) process rinse water from semiconductor operations; (4) Bright Nickel (Watt's bath) plating rinse water; (5) Sulfamate Nickel plating rinse water; (6) Electroless Nickel rinse water; (7) Chrome Conversion Coating rinse water; (8) Chrome Plating rinse water; (9) Nobel Metal Surface Treatment Baths; (10) Anodizing Surface Coating rinse water (Chromic, Phosphates, Sulfuric); (11) Zinc Plating rinse water; and (12) Cadmium Plating rinse water; (13) E-Cote rinse water.

Referring to FIG. 1, an exemplary embodiment of a system for recovery and maintenance in metal or electronic applications is shown. The system 100 includes a process bath 110 and at least one rinse tank 120. Two rinse tanks 121 and 122 are shown for illustrative purposes.

For this embodiment of the invention, an item 130 is initially placed into the process bath 110 for metal application.

Thereafter, the item 130 is removed from the process bath 110 and placed into a first rinse tank 121. This removes excessive chemical elements and contaminants as defined below.

The first rinse tank 121 is coupled to one or more chemical/water separation systems such as an electrodeionization (EDI) system 140 for example. The EDI system 140 separates recovered chemical elements within a fluid (e.g., an aqueous solution such as rinse water "diluate" normally having total dissolved solids less than 400 parts per million) and returns this fluid through a process line 150. This "process line" 150 involves any mechanism that assists in the transfer of fluid, inclusive or exclusive of conduits.

Additionally, the recovered chemical elements (referred to herein as "concentrate") are returned to the process bath 110 via a process line 160. The concentrate may be reused by the process bath 110 for metal application (e.g., coating, plating, etc.). Alternatively, shown by dashed line 180, the concentrate may be recovered for recycling purposes in lieu of direct return to the process bath 110.

In the event that a second rinse tank 122 is used, the fluid within the second rinse tank 122 (e.g., aqueous solution such as process water) may be cleaned by a water recycle treatment system 170. Such cleaning enables purified rinse water with low TDS to be returned to the second rinse tank 122 while resultant chemicals are recovered and treated for safe disposal.

In general, the EDI system 140 is configured for the removal of chemical elements and contaminants in order to return substantially purified water, return concentrate or even assist in the operations of a subsequently positioned systems. Hence, the EDI system 140 improves overall efficiency of the system 100 by removing chemical elements and contaminants that may reduce such efficiency. These chemical elements and contaminants may fall into one of five categories as shown in Table A below:

TABLE A

| CATEGORY | CHEMICAL/ CONTAMINANT TYPE | EXAMPLES |
| --- | --- | --- |
| 1 | Suspended Solids | debris, precipitates, graphite, etc. |
| 2 | Dissolved Metals | Nickel (Ni); Copper (Cu); Zinc (Zn); Chromium (Cr); Cadmium (Cd); Silver (Ag); Gold (Au), etc. |
| 3 | Hardness | Alkaline earth elements such as Calcium (Ca); Magnesium (Mg); Strontium (Sr); Barium (Ba). |
| 4 | organic | benzene disulfonic acid, benzene trisulfonic acid, benzene sulfonamides, saccharin, formaldehyde, coumarin, ethylene cyanohydrin, butynediol, thiourea, dextrin, alkylaryl ethoxylates, diisooxtyl sulfosuccinate, alkylsulfonimide |
| 5 | Grease/Oil & Solvents | mineral oil based fats and greases, machine oils, chlorinated hydrocarbons |

For instance, Alkaline earth elements are removed because they tend to precipitate, and thus, clog the EDI system 140. Likewise, organics are removed because they tend to either precipitate or foul the resin or membrane of the EDI system 140 if not removed from the process rinse water.

Figure 2A:
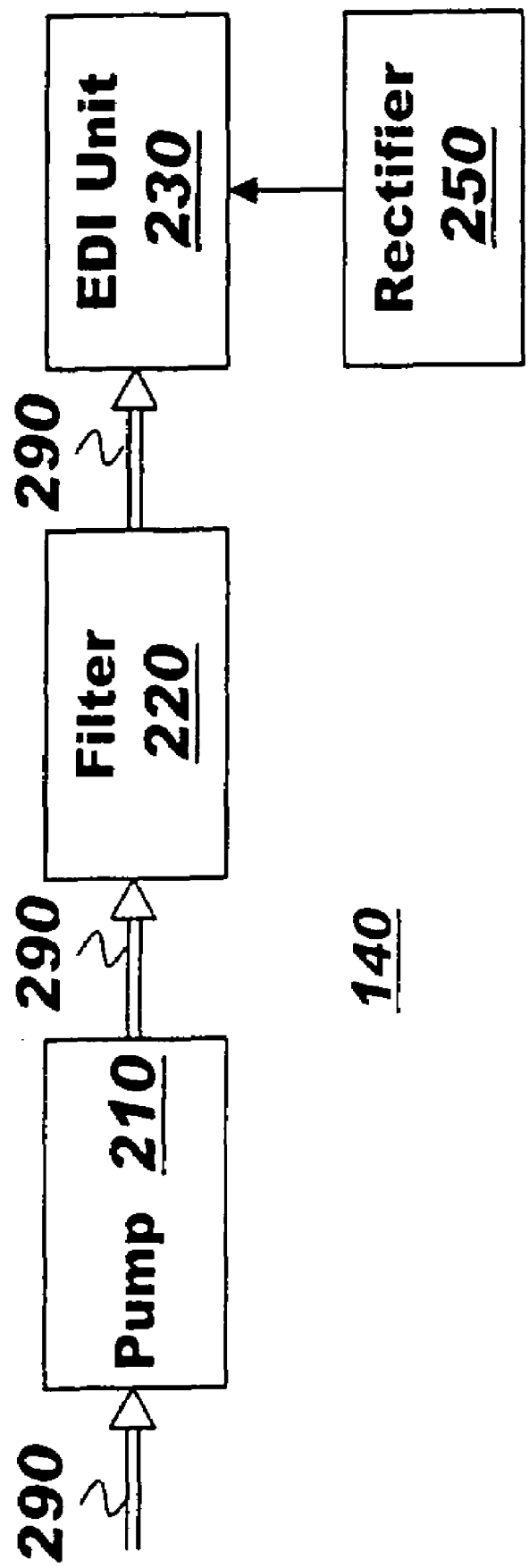
FIGS. 2A and 2B are a first exemplary embodiment of an electrodeionization (EDI) system.
Figure 2B:
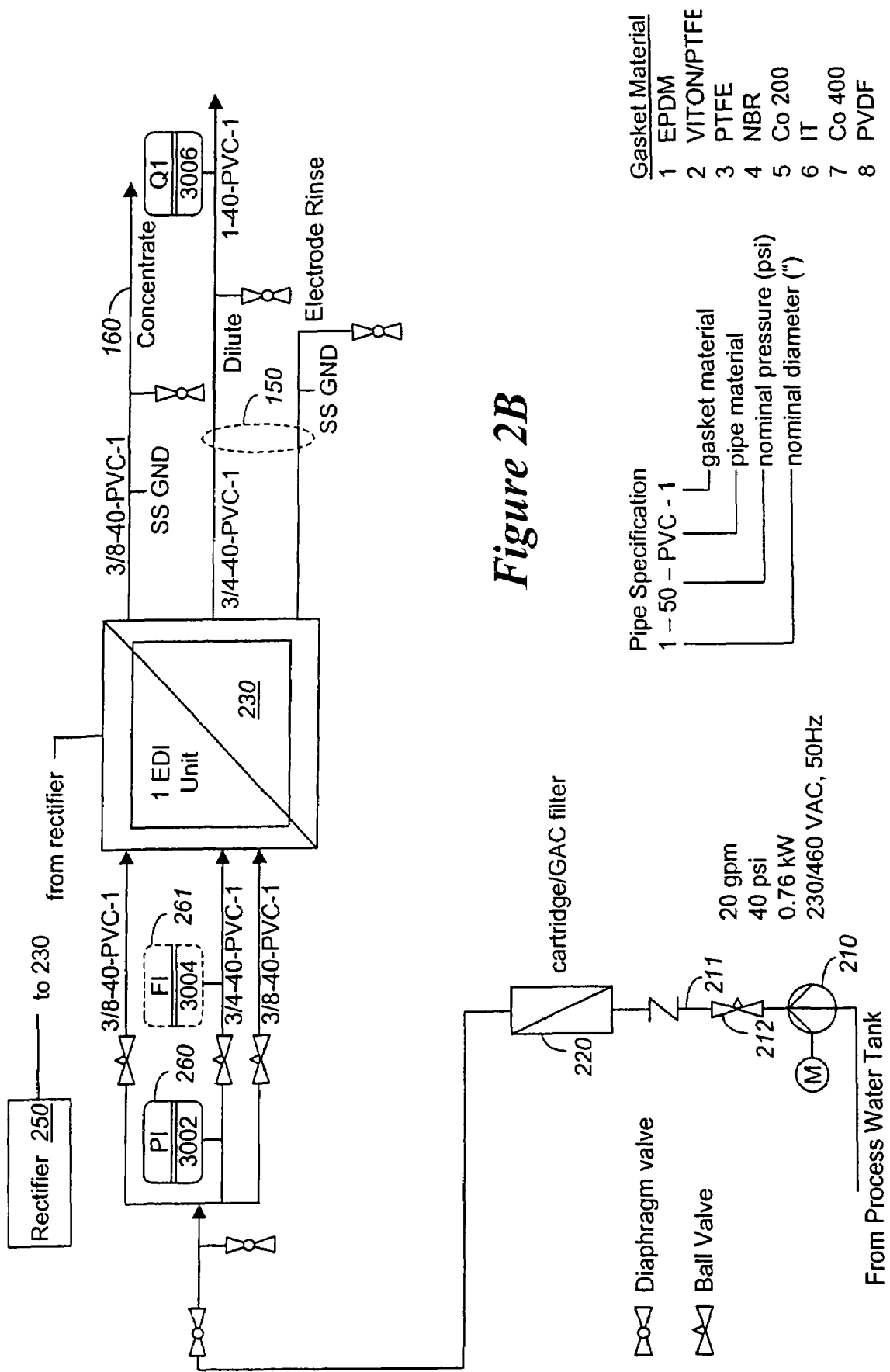

Referring now to FIGS. 2A and 2B, a first exemplary embodiment of the chemical/water separation system 140 operating as an EDI system is shown. For this embodiment, the EDI system 140 comprises a pump 210, a filter 220, an EDI unit 230, conduits 290 for interconnecting these components and a rectifier 250. The rectifier 250 energizes the EDI unit 230 while conduits 290 enable fluid to be transferred between certain components of the system 140. The conduits 290 may be PVC piping of varying diameter and supporting different psi (pressure/square inch) flow rates.

Herein, the pump 210 is adapted to a first conduit 211 that routes fluid (e.g., process water) to the filter 220. Such routing may occur continuously with the pump 210 constantly running during operation. Alternatively, the pump 210 may be throttled (turned on/off periodically) through the use of valve 212 to regulate the flow of fluid at a slower rate of flow.

The filter 220 is configured to remove harmful chemical elements or contaminants from the incoming fluid before receipt by the EDI unit 230. In one embodiment, the filter 220 removes suspended solids, dissolved metals, or grease/oil solvents. In one embodiment, the filter 220 is an activated carbon and particle filter to remove organic additives such as brightners, wetting agents, catalysts and stabilizers.

The filtered fluid is flow adjusted and pumped into EDI unit 230 by a corresponding EDI feed pump 260 and optional filter 261. As shown, the EDI unit 230 is configured to provide purified fluid (e.g., purified water or "diluate") via the process line 150 of FIG. 1 and perhaps as an electrode rinse. The recycled chemical elements are returned as concentrate over line 160.

Figure 3A:
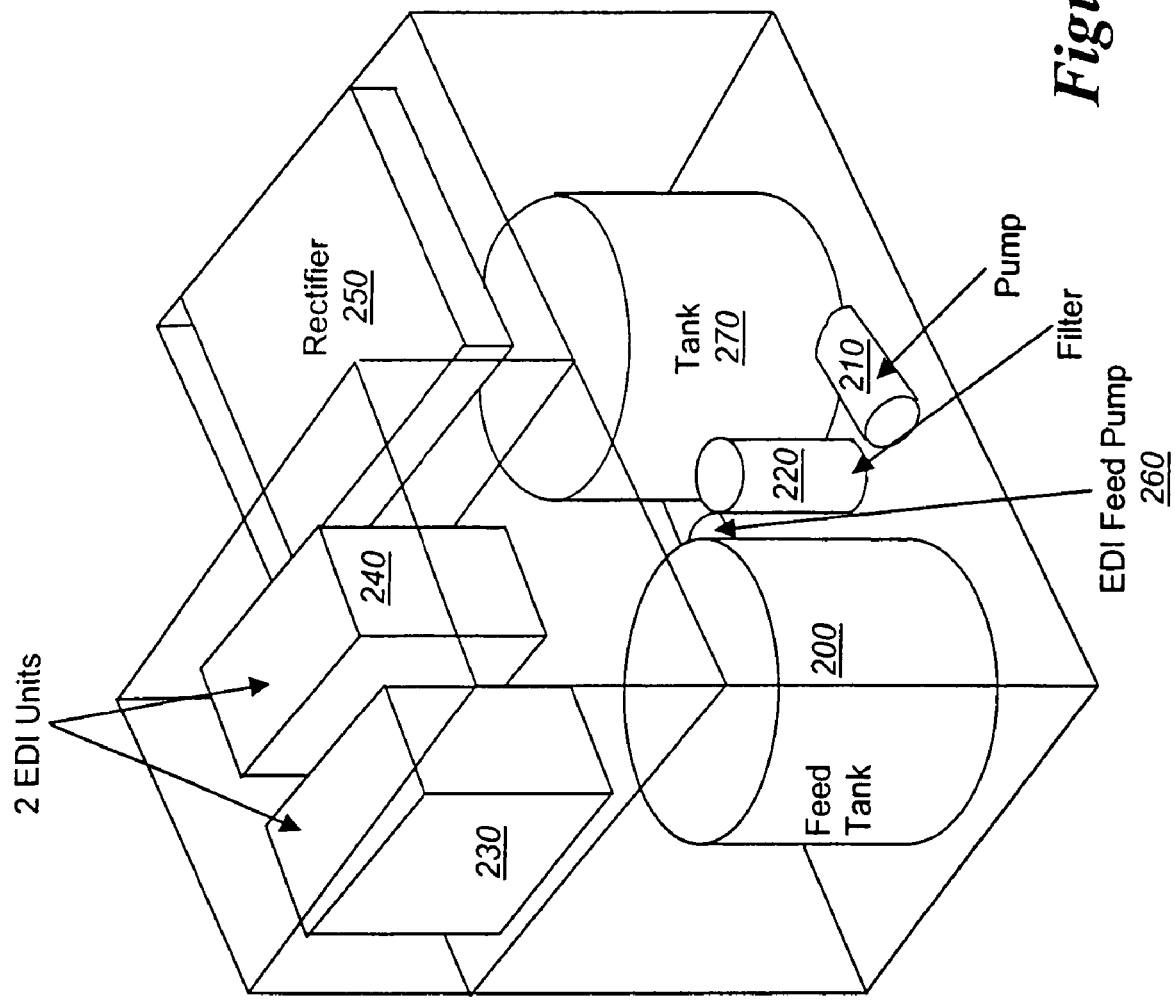
FIGS. 3A and 3B are a second exemplary embodiment of the electrodeionization (EDI) system.
Figure 3B:
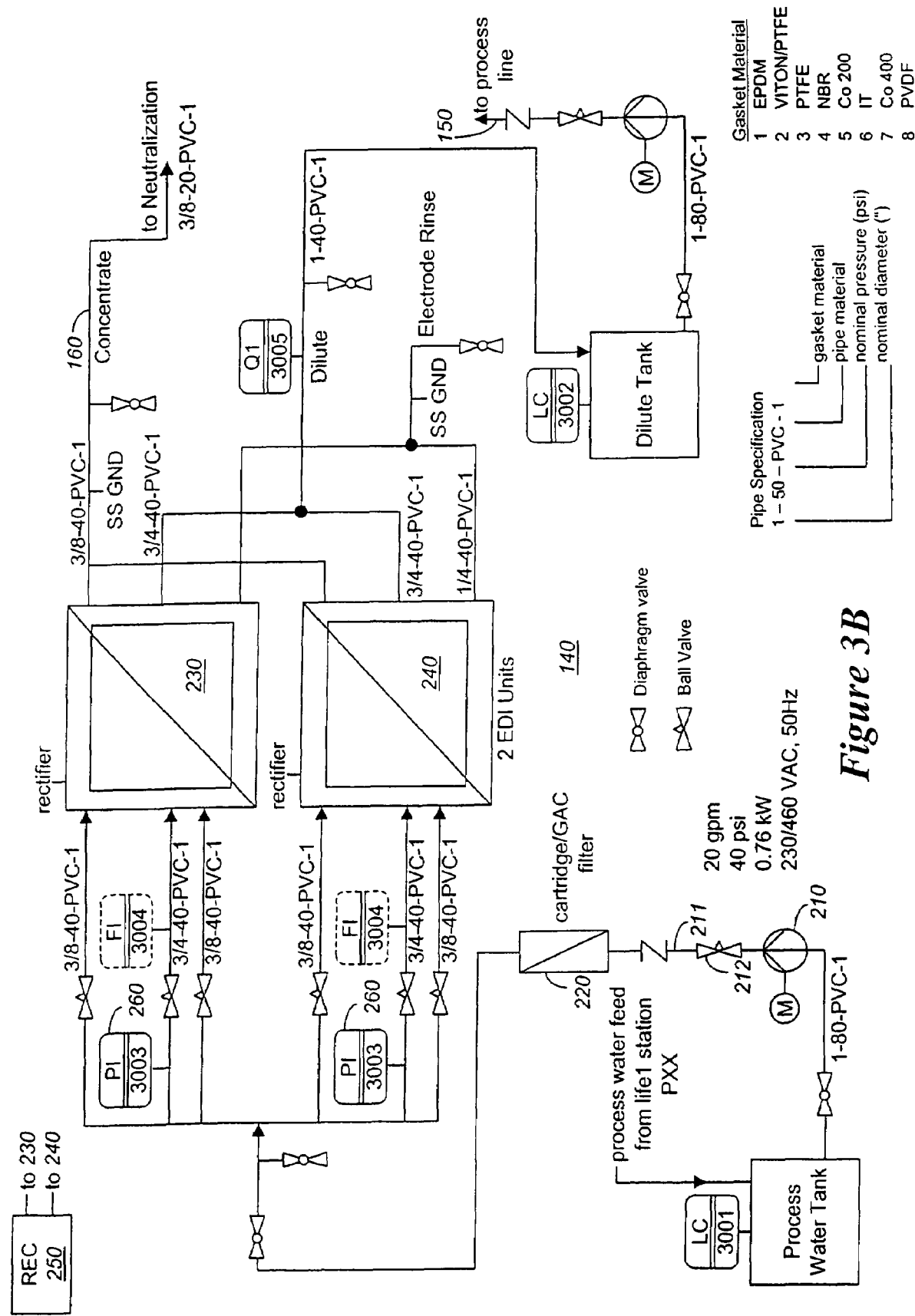

Referring now to FIGS. 3A and 3B, a second exemplary embodiment of the chemical/water separation system 140 operating as an EDI system is shown. For this embodiment, the EDI system 140 comprises a feed tank 200, pump 210, a filter 220, at least two EDI units 230 and 240, a rectifier 250, an EDI feed pump 260 and a diluate tank 270. All components except for the rectifier 250 is coupled together by conduits. The general placement of these components within a frame of the EDI system 140 is illustrated in FIG. 3A. It is contemplated, however, that the feed tank 200 may be equivalent to the first rinse tank 121 of FIG. 1 without reliance on a separate tank as shown. However, a separate tank may be used as an alternative.

The pump 210 is adapted to a conduit 211 that routes fluid (e.g., process water) from the feed tank 200 (or process bath 110 of FIG. 1) to a filter 220. Such routing may occur continuously with the pump 210 constantly running during operation. Alternatively, the pump 210 may be throttled (turned on/off periodically) to regulate the flow of fluid at a slower rate of flow.

In one embodiment, the filter 220 is an activated carbon and particle filter to remove organic additives such as brightners, catalysts and stabilizers. The filtered fluid is flow adjusted and pumped into one or two EDI units 230 and/or 240 by a corresponding EDI feed pump 260.

When implemented as more than one unit, the EDI unit(s) 230 and/or 240 may be configured to operate either in parallel or in series. For instance, the first EDI unit 230 may be configured to provide purified fluid (e.g., purified water or "diluate") to tank 270 for subsequent return into a process line rinse system (e.g., first rinse tank 121 via process line 150 of FIG. 1). Subsequently, the second EDI unit 240 may further purify the product. The recycled water and plating or process bath chemical elements are returned to the main process line, over line 160.

In general, the rectifier 250 controls the operations of the EDI units 230 and 240. The rectifier 250 energizes the EDI units at specific amperage (e.g., 6-12 amperes per 3-5 gallons per minute "gpm") and voltage (e.g., 300-380 volts). Such amperage and voltage are higher than traditional EDI systems used for reverse osmosis permeate purification.

Figure 4:
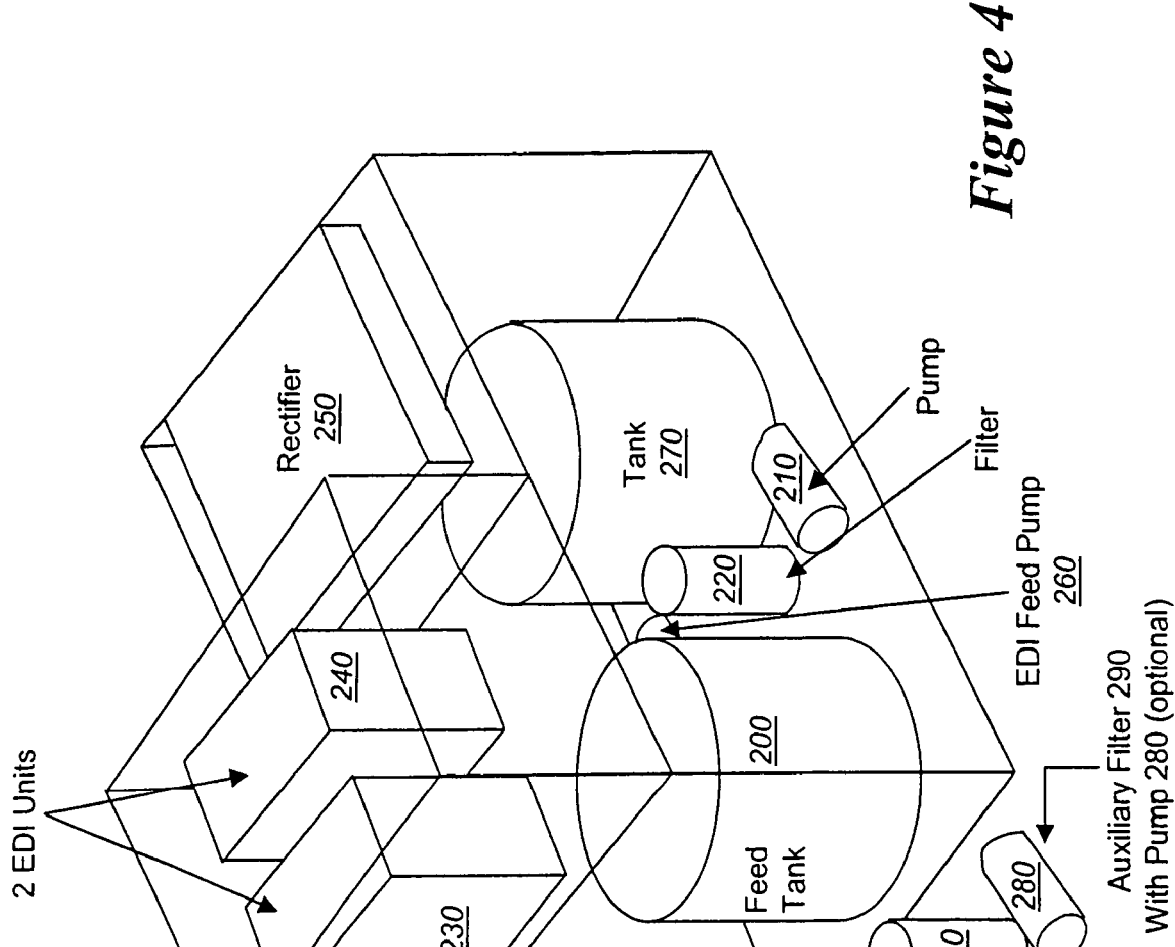
FIG. 4 is a third exemplary embodiment of the electrodeionization (EDI) system

In another embodiment as shown in FIG. 4, an auxiliary filtering system 290 with process pump 280 may be implemented to filter received process water before supplying the process water to the EDI feed pump 210. In detail, the filtering system 290 may be configured as any one or more of the following: (1) a cation exchange system (removes cations like dissolved metals, hardness) (2) an anion exchange system (removes organics, anions); (3) a combination of the cation exchange system and anion exchange system; (4) a cation exchange system containing ion selective resin (removes specific bivalent metals such as Ni, Cu, Zn, etc.); (5) an Electrodialysis system (purify process water with higher level of dissolved solids being subsequently removed by the EDI system 140); (6) a reverse osmosis system; (7) a filter containing special product ion exchange resins to remove problem ions from water; (8) a multi-media filter that comprises sand, Carbon and Alumina; (9) a filter containing adsorber materials such as Alumina, clay, diatomaceous earth, Iron Oxide, sponge, greensand, adsorber resin, zeolites and similar chemical compounds; and (10) a water softener.

After receipt of filtered process water from filtering system 290, the pump 210 provides the water to the filter 220, which performs additional filtering on the water and routes the water in a manner as described above in FIGS. 3A and 3B.

Figure 5:
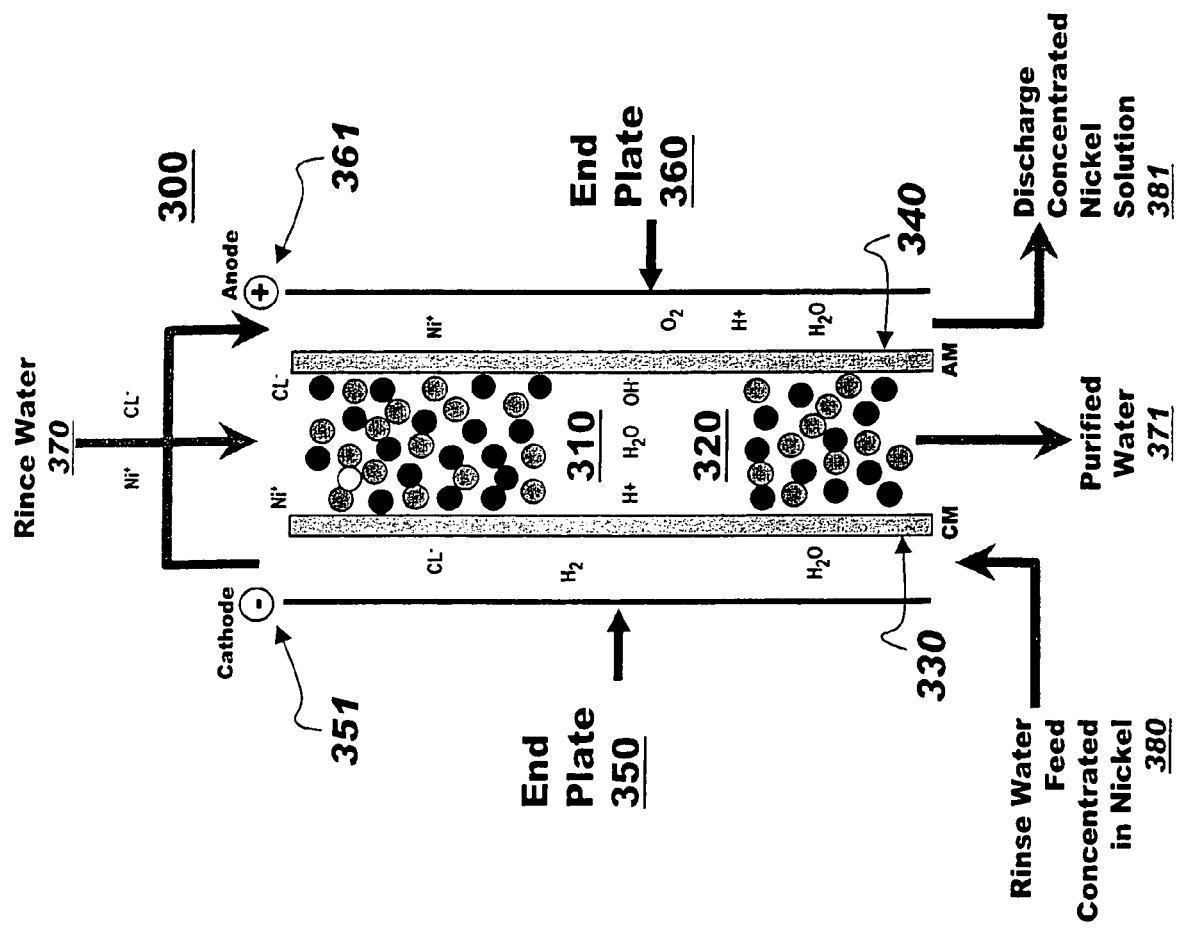
FIG. 5 is an exemplary embodiment of an EDI unit of FIGS. 2A-4 illustrating the arrangement of resin bed, membranes spacers and electrodes in an EDI unit.

Referring now to FIG. 5, an exemplary embodiment of an EDI unit of FIGS. 2A, 2B, 3A, 3B and 4 is shown. Each EDI unit (e.g., EDI unit 230) comprises a membrane stack 300 that, for this embodiment, includes ion exchange beds 310 and 320 sandwiched between ion exchange membranes 330 and 340. Two end plates 350 and 360 are coupled to the membrane stack 300. Each of these end plates 350 and 360 include an electrode 351 and 361, respectively. The stack 300 may be physically stabilized by these two end plates 350 and 360 attached together by any clamping mechanism (e.g., a bolt/nut, hydraulic clamp, etc.).

For this embodiment, the ion exchange beds 310 and 320 may be mixed beds, which remove both cations and anions from incoming fluid to be processed. Alternatively, the ion exchange beds 310 and 320 may be specific cation resin beds, anion resin beds or a combination of the two types of beds. Similarly, the ion exchange membranes 330 and 340 may be ion specific (e.g., cationic membranes or anionic membranes) or perhaps mixed cation/anion membranes.

Figure 7:
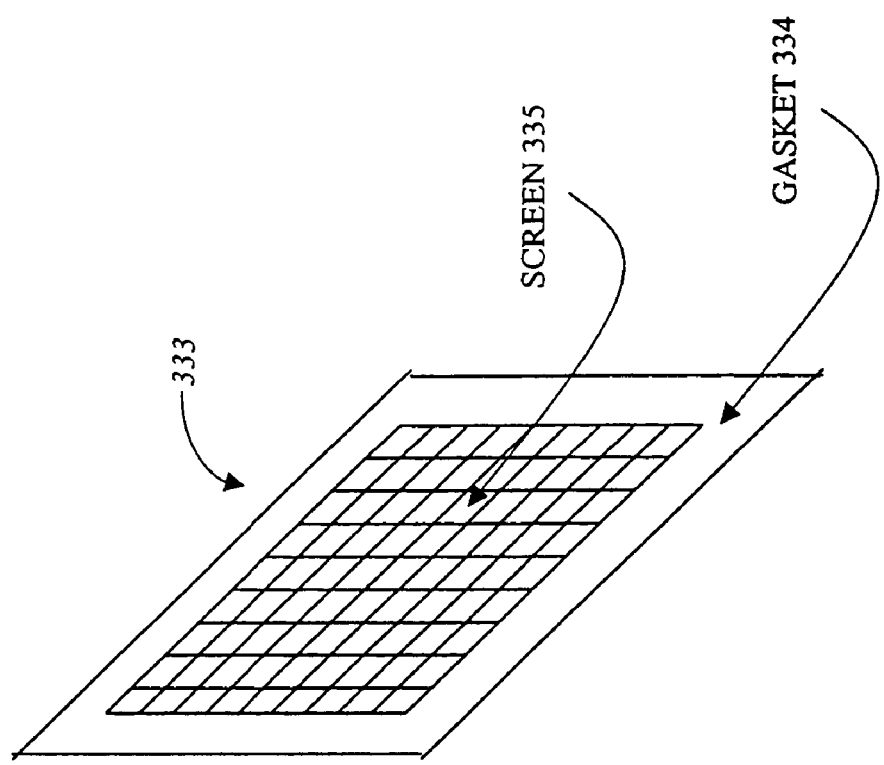
FIG. 7 is an exemplary embodiment of a spacer being part of the ion exchange membrane of FIG. 6.
Figure 6:
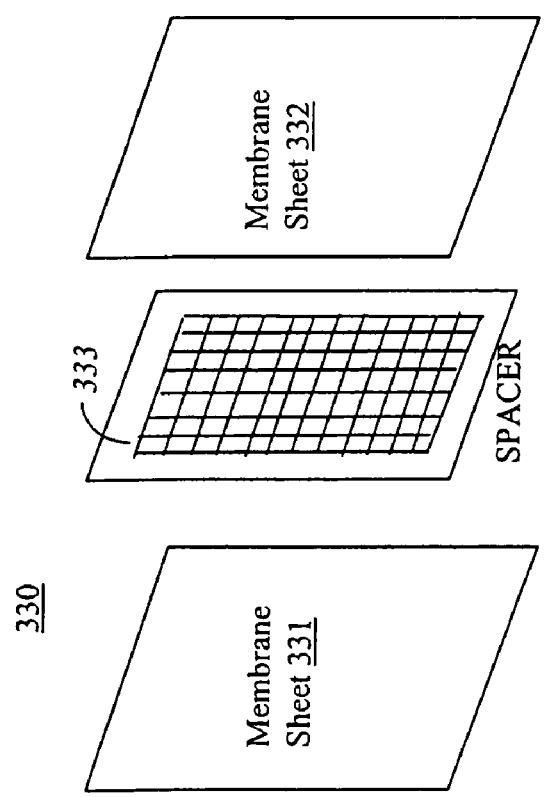
FIG. 6 is an exemplary embodiment of an ion exchange membrane of FIG. 5.

As shown in FIG. 6, ion exchange membrane 330 includes at least two membrane sheets 331 and 332 separated by a spacer 333. The spacer 333 is a device that provides a permanent defined distance between two adjacent membrane sheets 331 and 332, a containment of defined amount of mixed bed ion exchange resins and a space for liquid to flow or move between membrane sheets 331 and 332. More specifically, the spacer 333 may be implemented with a standard spacer or perhaps a spacer having diagonally woven screens as shown in FIG. 7. An optional gasket 334 may surround the perimeter of the screen 335 of the spacer 333 as described below.

The spacer 333 optimizes fluid distribution between the membrane sheets 331 and 332, retention time for ion exchange reactions and linear fluid velocity for mass transfer. The mass transfer occurs between two liquids separated by the membrane sheets 331 and 332 and the ion exchange resin 310. The driving force for the ion transfer is an electrical potential between the electrodes 351 and 361, established by the rectifier 250 of FIGS. 2A, 2B, 3A, 3B and 4. Basically, the spacer 333 provides significantly improved fluid dynamics and consequently higher mass transfer performance.

Incoming fluid (e.g., rinse water) 370 is configured to flow through a first ion exchange resin mixed bed 310 of the EDI unit 230. The anions ($Cl^-$) are attracted from the fluid 370 by the anode electrode 361, which pass through anion exchange membrane 340 and finally collect around that electrode 361. Concurrently, the cations (e.g., $Ni^+$) are attracted from the fluid 370 and collect around the cathode electrode 351 after passing through cation exchange membrane 330. A second pass of the fluid 370 through ion exchange mixed resin bed 320 produces a substantially purified fluid 371 for possible return to the rinse tank 121 of FIG. 1 for example.

Thereafter, fluid having a particular cation concentration 380 (e.g., Nickel concentrated rinse water as one embodiment) is configured to flow physically proximate to the cathode electrode 351 and then along the anode electrode 361 to produce a metal concentrated fluid 381 (e.g., Nickel concentrated rinse water). The resultant metal concentrated fluid 381 is discharged to replenish the chemical composition of process bath 110 of FIG. 1 or sent for recycling.

For this embodiment, with respect to each spacer, it contains one in-flow and one outflow channel and separates alternating membrane sheets. Every other membrane/spacer combination (referred to as an "EDI cell") is designed in the same manner, and inflows and outflows are connected with each others. The fluid or process water flows in and out of each spacer into alternating membrane sheets. Also, fluid or process water flows into the other alternating spacer and resulting reject out of alternating. All inflows and outflows have a common inflow feed channel, and all outflows go into a common outflow channel, so all alternate connected cells contribute liquid to one channel.

As shown in FIG. 7, a specially formulated polymeric material gasket 334 is incorporated around the spacer screen sheet 335 resulting in a "one-piece" product. The gasket material also provides improved seal properties of the entire membrane stack 300, addresses common leakage problems encountered during operation of EDI systems and provides good mechanical and stability properties at the interface between gasket 334 and screen material 335.

The result of the illustrative design provides the a number of characteristics to the EDI cells, inclusive of a partial list of these characteristics set forth below:

(1) Engineered and optimized performance as current density ($A/ft^2$); namely, the spacers include diagonally woven screens to provide optimized flow characteristics and thin designed EDI cells allow for optimized conductance and high mass transfer rates.

(2) Optimized fluid distribution and flux for high ion separation efficiency; namely, the angled-screen design (40-55 degree direction) provides for higher mass transfer performance. Also, the optimized thickness of the entire spacer design varies for industrial applications to achieve specific system performance as well as mechanical stability.

(3) Optimized cell compartments and operating conditions allow for high current and mass transfer and performance. For instance, by maintaining a small distance between membranes, this allows for improved ion transportation rate and low diffusion resistance. Moreover, optimized fluid dynamics and high flow velocity provide high ionic concentrations in cell compartments. The high ionic concentrations allow high migration rates through membranes, and thus high performance and efficiency.

While certain exemplary embodiments have been described and shown in the accompanying drawings, it is to be understood that such embodiments are merely illustrative of the invention in order to provide a thorough understanding of the invention. Also, well-known circuits are not set forth in detail in order to avoid unnecessarily obscuring the invention.

What is claimed is:

1. A system comprising:
   a rinse tank;
   a first process line coupled to the rinse tank;
   a second process line;
   a filter to receive a rinse fluid and to remove matter from the rinse fluid; and
   at least one electrodeionization (EDI) unit coupled to the filter, the EDI unit to concurrently recover a chemical element from the rinse fluid and purify the rinse fluid by separating the recovered chemical element from the rinse fluid, and thereafter, outputting the rinse fluid over the first process line back to the rinse tank that originally supplied the rinse fluid and outputting a concentrate of the recovered chemical element over the second process line; and
   a process bath coupled to the second process line, the process bath being used to apply the recovered chemical element to an item placed within the process bath.

2. The system of claim 1, wherein the rinse fluid within the rinse tank being used to remove the recovered chemical elements from the item, the recovered chemical elements being excessive metal ions that were applied to the item at the process bath.

3. The system of claim 1, wherein the recovered chemical element is a metal.

4. The system of claim 3, wherein the recovered chemical element is one of Nickel or Zinc.

5. The system of claim 1, wherein the matter includes at least one of a chemical element or a contaminant.

6. The system of claim 1, wherein the recovered chemical element is a dissolved metal being one of Nickel, Copper, Zinc, Chromium, Cadmium, Silver and Gold.

7. The system of claim 1, wherein the EDI unit comprises at least two ion exchange membranes; and
   a plurality of ion exchange beds interposed between the at least two ion exchange membranes.

8. The system of claim 7, wherein at least one of the ion exchange membranes comprises (i) a plurality of membrane sheets and (ii) a spacer interposed between at least two of the plurality of membrane sheets, the spacer comprises a gasket bordering a screen diagonally woven at a selected acute angle.

9. The system of claim 8, wherein the acute angle is in a range between forty degrees and fifty degrees.

10. The system of claim 1 further comprising:
    a pump coupled to the filter via a conduit, the pump to output the rinse fluid to the filter; and
    a rectifier coupled to the EDI unit.

11. A system comprising:
    a process bath to apply chemical elements to an Item placed therein;
    a rinse tank including a tluid into which the item is placed and excessive chemical elements from the item are removed;
    a filter to receive the fluid via a first conduit;
    a first electrodeionization (EDI) unit coupled to the filter via a second conduit, the first EDI unit to recover chemical elements from the fluid by separating a first chemical element from the fluid, outputting a first concentrate with the recovered first chemical element over a first process line and outputting a purified fluid being the fluid with a lessened concentration of the first chemical element; and
    a second EDI unit coupled to the first EDI unit filter, the second EDI unit to recover a second chemical element from the purified fluid by separating the recovered second chemical element from the purified fluid, outputting a concentrate with the second chemical element and outputting a diluate with a lessened concentration of the second chemical element; and
    a rectifier coupled to the at least two EDI units, the rectifier to control operations of the at least two EDI units.

12. The system of claim 11 further comprising a first tank to store the fluid and provide the fluid to the pump at a selected flow rate, and a second tank to receive the dilute to return to the first tank.

13. The system of claim 12 further comprising a pump coupled to the filter via the first conduit.

14. The system of claim 13 further comprising a filtering system to filter a selected chemical element or contaminant from the fluid prior to the pump receiving the fluid, the filtering system comprises a filter and a pump.

15. The system of claim 12, wherein the at least two EDI units to provide the concentrate of the recovered first chemical element to a third tank being a process bath.

16. The system of claim 11, wherein the first chemical element is the same as the second chemical element.

17. A method for recovering chemical elements from rinse water used in a system having a process bath and a rinse tank, comprising:
    receiving the rinse water that comprises chemical elements; and
    processing the rinse water with an electrodeionization (EDI) unit in order to recover the chemical elements from the rinse water and thereby separate the recovered chemical elements from the rinse water in order to return the recovered chemical elements back into the process bath used for plating or coating of an item using the recovered chemical elements.

18. The method of claim 17, wherein the processing of the rinse water further comprises filter both the chemical elements and contaminates in the rinse water and returning purified rinse water back to the rinse tank.

19. The system of claim 17, wherein prior to receiving the rinse water, the method further comprises removing the chemical elements being excessive metal ions that were applied to the item placed within a rinse tank after removal of the item from the process bath upon which non-excessive metal ions remain attached to the item.

* * * * *